(12) United States Patent
Bertino

(10) Patent No.: US 6,988,353 B2
(45) Date of Patent: Jan. 24, 2006

(54) ARRANGEMENT INTRODUCED IN AN AGRICULTURAL IMPLEMENT TO REAP AND COLLECT BRANCHES OF VARIOUS CULTURES

(76) Inventor: Luiz Henrique Bertino, Rua Eng. Balduino, 403, Pindorama, 15830-000 (BR)

( * ) Notice: Subject to any disclaimer, the term of this patent is extended or adjusted under 35 U.S.C. 154(b) by 0 days.

(21) Appl. No.: 10/899,324

(22) Filed: Jul. 26, 2004

(65) Prior Publication Data

US 2005/0081503 A1   Apr. 21, 2005

(30) Foreign Application Priority Data

Jul. 26, 2003   (BR) .............................. 8301332 U

(51) Int. Cl.
*A01D 46/00* (2006.01)

(52) U.S. Cl. .................................... 56/328.1
(58) Field of Classification Search ................. 56/14.7, 56/16.4 R, 330, 328.1, 327.1
See application file for complete search history.

(56) References Cited

U.S. PATENT DOCUMENTS

| 4,350,207 A | * | 9/1982 | Ben-Dor ....................... 171/58 |
| 4,982,559 A | * | 1/1991 | Calais ........................ 56/328.1 |
| 5,465,562 A | * | 11/1995 | Croft ......................... 56/16.4 R |
| 6,105,352 A | * | 8/2000 | Tremblay et al. .............. 56/330 |
| 6,854,255 B1 | * | 2/2005 | Emerson ....................... 56/330 |

FOREIGN PATENT DOCUMENTS

| BR | PI9902566-3 | 8/2000 |
| BR | PI0001647-0 | 6/2001 |
| BR | PI0203312-7 | 11/2002 |

* cited by examiner

*Primary Examiner*—Árpád Fábián Kovács
(74) *Attorney, Agent, or Firm*—John A. Merecki; Hoffman, Warnick & D'Alessandro LLC

(57) ABSTRACT

An agricultural implement comprising a chassis (1) formed of various front (2) and rear (3) tubular, transversal components interconnected with crossbeams (4) and front (5) and rear (6) vertical and lateral struts, forming an ordinarily parallelepiped-shaped structure, the front and rear portions of which constitute attachment points for the front (7) and rear (8) wheel carriages, transforming the assembly into a true trailer, the rear portion of which includes universal coupling points for connection to the drive unit; in addition, the reaping assembly (27) is transversely assembled on such chassis (1) and, right above it or inside the first half of chassis (1) and before the conveyors (24) is assembled a branch collection assembly (28), so that the plant, on being reaped by assembly (27), can be immediately collected by the collecting assembly (28), which throws the branches on the conveyors (24), where the opening (15) concentrates the collected material for alignment thereof over the ground.

1 Claim, 5 Drawing Sheets

ARRANGEMENT INTRODUCED IN AN AGRICULTURAL IMPLEMENT TO REAP AND COLLECT BRANCHES OF VARIOUS CULTURES

TECHNICAL FIELD

The present model of utility refers to a new construction arrangement carried out in a special type of agricultural equipment classified as trailered type, specially designed for coupling thereof to an automotive machine; accordingly, this is a large-size equipment for the agricultural sector, where it serves to perform three distinct functions: to reap, collect and align different types of plants, such as: beans, wheat, soybeans and other types of grains.

STATE OF THE ART

There are currently several agricultural implements to perform the above functions, such as the ones taught on the Brazilian Documents P.I. 1647 of Apr. 19, 2000—BRANCH REAPING ASSEMBLY, P.I. 9,902,566 of Jun. 25, 1999—BRANCH REAPING/COLLECTING ASSEMBLY FOR GRAIN HARVESTERS and P.I. 203,312 of Aug. 16, 2002—BRANCH REAPING/COLLECTING ASSEMBLY FOR DIVERSE CULTURES.

P.I. 1647 describes an agricultural complement in the shape of an independent head, formed of a structure capable of being easily coupled to different types of tractors, from the simplest to the most sophisticated one, so that said head can be driven by said tractor's power takeoff and, accordingly, with a simple equipment a farmer has an implement at his disposal to reap and align different types of plants, particularly beans. Therefore, the scope of this invention is a mechanical assembly to optimize the entire harvesting process for different types of grain-producing plants, such as: wheat, rice, sorghum, pea, bean plant and/or others; however, this mechanical assembly, in addition to presenting a reduced manufacturing cost, requires few maintenance operations, and is also capable of being adopted by small- and medium-scale producers.

P.I. 9,902,566 describes an agricultural implement in the shape of an independent head formed of two structures, the first one with mechanical resources for assembling of a collecting system and a reaping system; the latter cuts the plant at the base thereof, whereas the other collects the branches and throws them back, where two transversely aligned conveyors are located and moving in opposite direction, pulling the branches from the collecting roll towards the center of the assembly and, from that point backwards, the third conveyor takes over, so that the plants can be discharged inside another structure, where other conveyors, as well as other assemblies of the harvester will process the collected material, that is, separating the branches and dirt, dispensing the grain in a completely clean condition. Accordingly, the scope of this invention is to provide a mechanical assembly to optimize the entire harvesting process for different grain-producing plants, such as: wheat, rice, sorghum, peas, bean plant and/or others.

In the two cases cited, all mechanical parts of the agricultural implement are driven by the tractor's power takeoff, and, accordingly, different belt- and chain transmissions are employed.

On the other hand, both implements have also been developed for small- and medium-scale producers; accordingly, they are machines having some restrictions, mainly in respect of the performance thereof.

P.I. 203,312 has been developed to materialize a large-scale reaping/collecting assembly to be coupled to an automotive machine which, in this case, is not a tractor, but rather a unit having much more power and employed to drag large-scale agricultural equipment. An automotive unit is generally a considerably large power unit, including a potent, usually diesel engine not only for displacement thereof but also to drive one or more high-power oil pumps to drive different hydraulic drives, particularly the motors and pistons. In that manner, large-scale producers are usually equipped with such kind of automotive machine, so that only one unit can drag innumerable agricultural equipment, such as: branch reapers/collectors, harvesters and other equipment to reap, collect and process different types of cultures.

SCOPES OF THE MODEL

In this patent, even though the improvements have resulted in a more efficient machine, it has been noticed that some of its mechanical assemblies could be improved even more and, accordingly, a new constructive arrangement has been adopted, such as, for example, for the hydraulic system which, in the previous case, was assembled on the higher-, median portion of the machine, whereas in the model in question the entire hydraulic system has been distributed near the mechanical assemblies which will be driven by said hydraulic assemblies, thereby considerably improving the assembly's performance.

DESCRIPTION OF THE DRAWINGS

For a better understanding of the present invention, a detailed description thereof is made below, with reference to the appended drawings, wherein.

DETAILED DESCRIPTION

Figure 1:
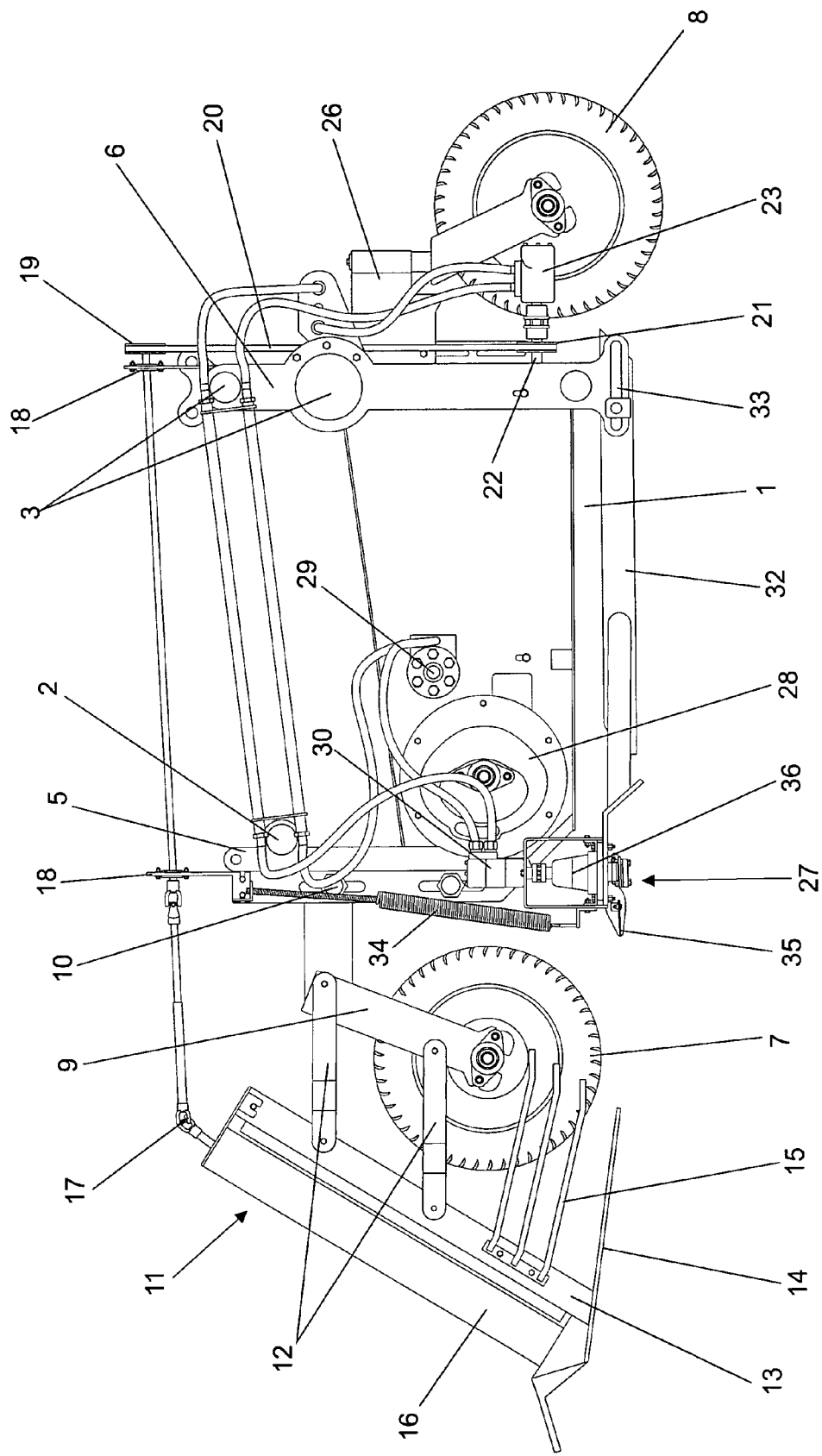
FIG. 1 is a left side elevation view.
Figure 2:
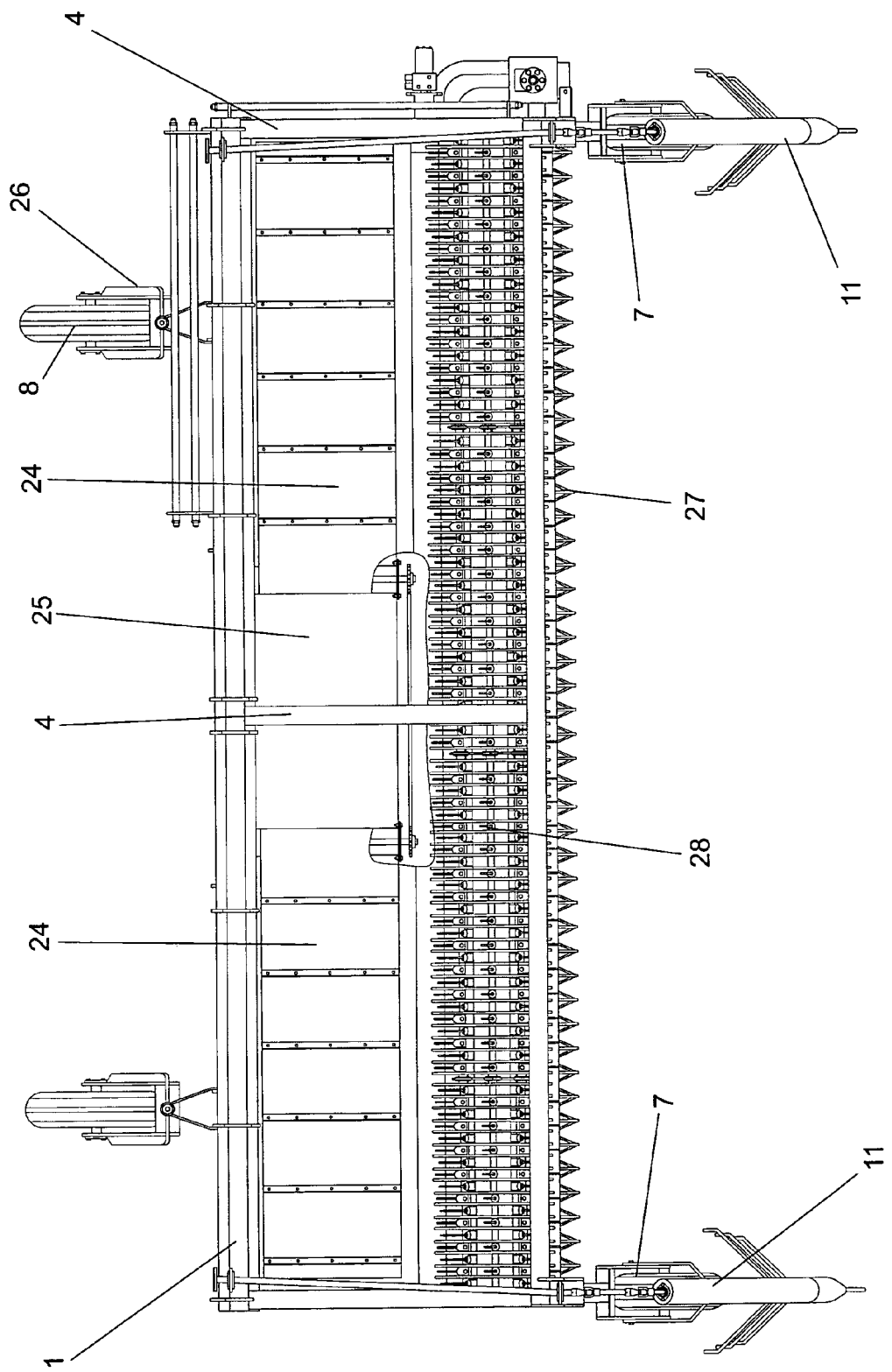
FIG. 2 shows a top view.
Figure 3:
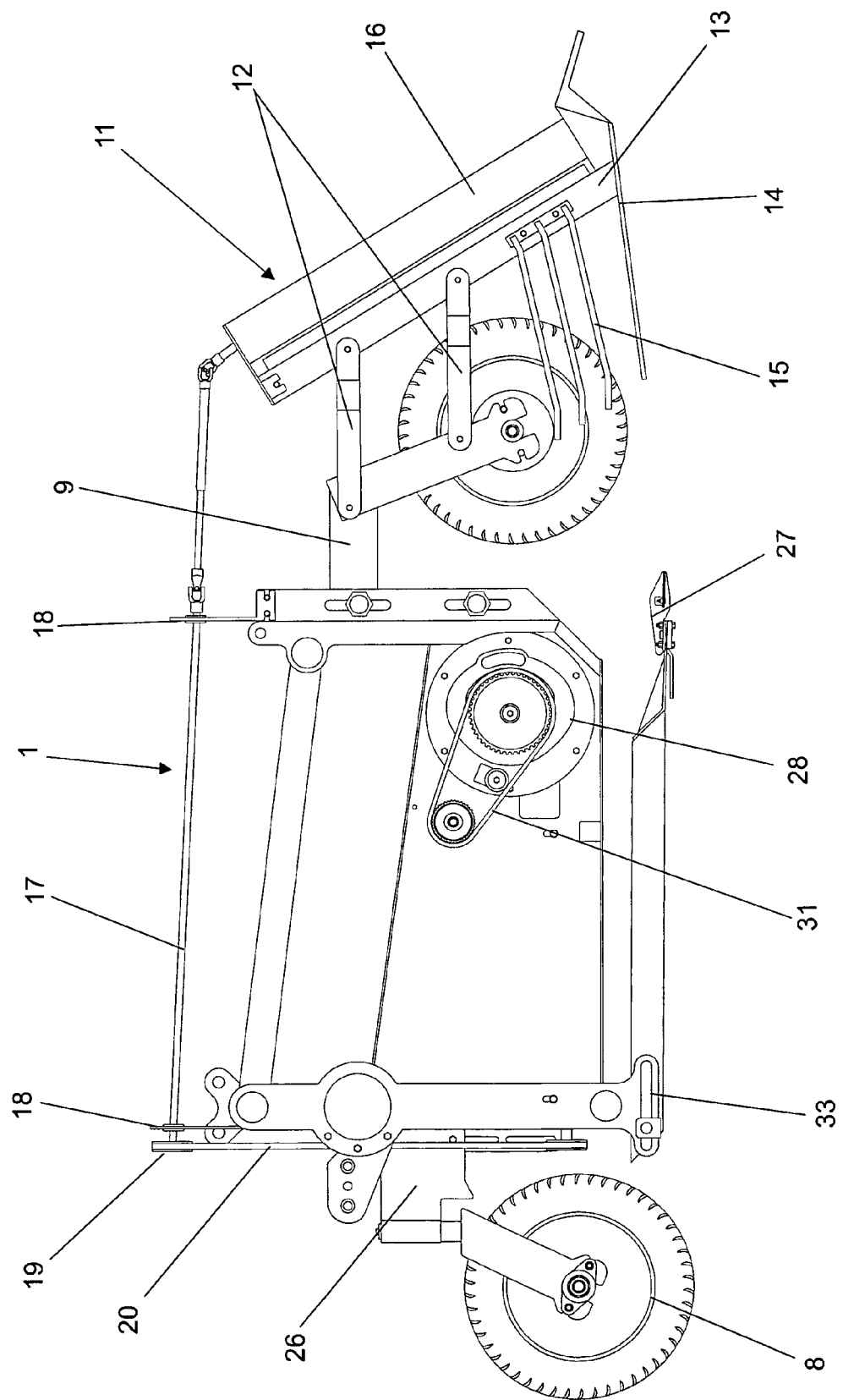
FIG. 3 illustrates a right side elevation view.
Figure 4:
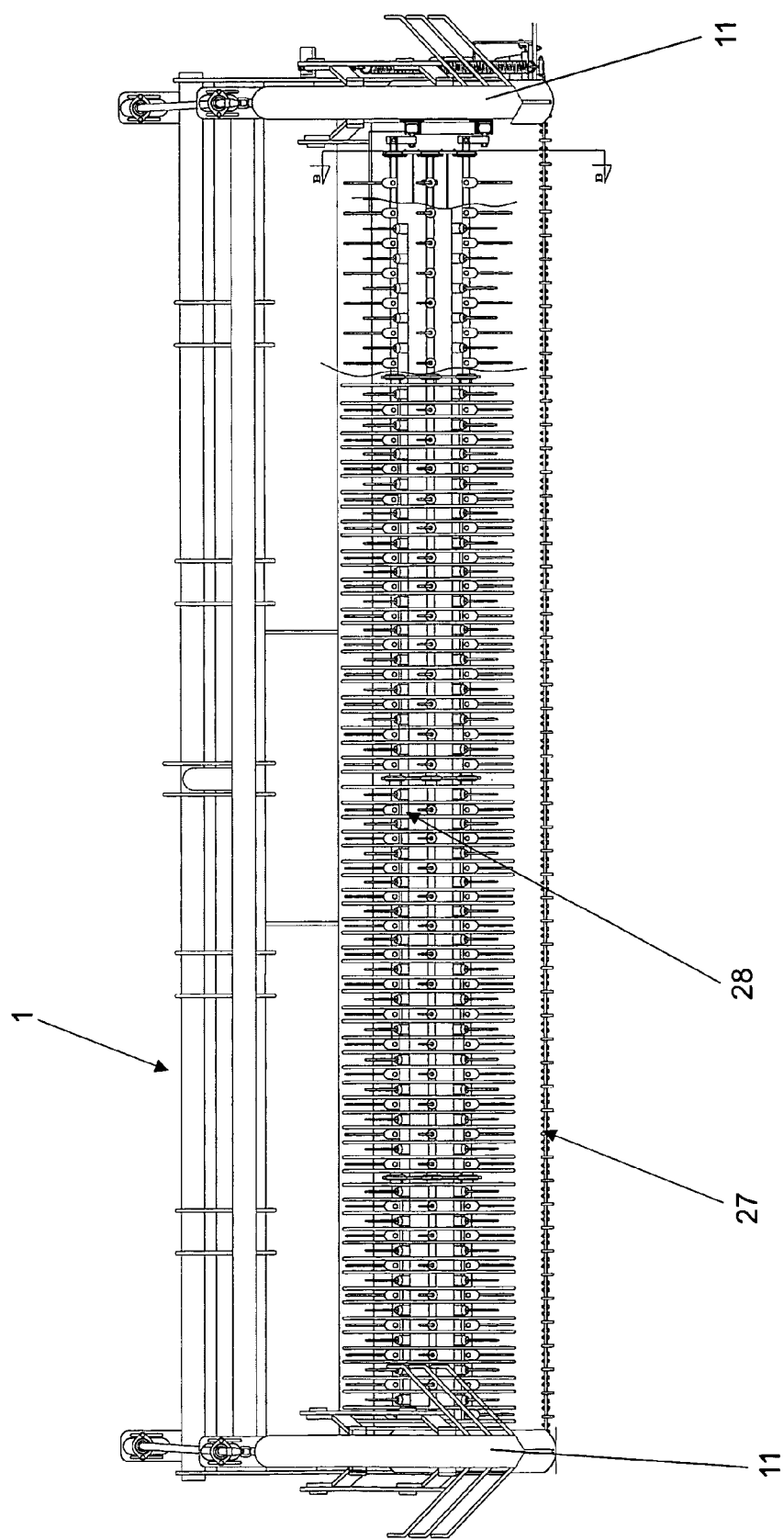
FIG. 4 shows a front elevation view.

In accordance with these illustrations and the details thereof, the present model of utility, PROVISION INTRODUCED IN AGRICULTURAL IMPLEMENT FOR REAPING AND COLLECTING BRANCHES OF DIVERSE CULTURES comprises a chassis (1) formed of several front (2) and rear (3) transversal tubular components interconnected by crossbeams (4) and front (5) and rear (6) vertical and lateral struts, forming an ordinarily parallelepiped-shaped structure, the front and rear portions of which are attachment points for the front (7) and rear (8) carriages, thereby transforming the assembly into a true trailer, the rear portion of which includes universal coupling points for the drive unit (not illustrated).

The front wheels (7) are assembled on the lower ends of L-shaped supports (9), the upper ends of which are adjustably attached (1) to the corresponding portion of the structure (1), where said supports (9) also work as supports for the line openers (11) assembled at the front of the front wheels (4), with each assembly having a pantographic support formed of two arms (12) which at one end thereof are hingedly attached to the L-shaped support (9) whereas the opposite ends thereof are hingedly attached to a ramped structure (13), the lower end of which has a skid (14) and a bar comb (15) attached thereto; in addition, along the front portion of such ramped structure (13) a roller (16) is rotationally attached thereto; said roller, in addition to having its surface provided with a sinusoidal rib, also has the upper end thereof operationally coupled to the cardan shaft (17) which in turn extends rearwards, crossing the entire structure (1), passing through two bearings (18), so that the end thereof can receive a pulley (19) and the respective belt (20) which extends downwards to another lower pulley (21), the shaft (22) of which is driven at one end thereof by an hydraulic motor (23), whereas the opposite end thereof is arranged to drive one of the two conveyors (24) transversely assembled at the lower, rear portion of the structure (1), with these conveyors serving to receive the collected branches, and a discharge opening (25) being provided between said conveyors; to that effect, said conveyors (15) rotate in opposite directions, in order to displace the collected branches towards said central opening (25).

At the rear portion of the machine, the other wheel assembly (8) is mounted on an assembly with supports (26), transforming them into steerable rollers or wheels.

At the front, lower portion of the structure or chassis (1) the reaping assembly (27) is transversely assembled and, right above it or inside the first half of the chassis (1) and before the conveyors (24) the branch collecting assembly (28) is assembled, with both being driven by the respective hydraulic motors (29) and (30), with the first one including a transmission (31), whereas the other is directly assembled to the drive shaft of said reaping assembly (27), which is comprised of a lower structure (32) practically in the shape of a frame, with the rear portion thereof being adjustably attached through a sliding fit (33) directly to the rear, lower portion of chassis (1), whereas at the front end said reaper is kept suspended by a vertical spring (34) and respective stretching bolt attached to the chassis (1); also at the same end said reaper possesses the cutting points (35), each crossed by a V-shaped cutting blade assembled on a ruler which is in turn coupled to a drive box having an eccentric drive shaft (36) which is in turn coupled to the hydraulic motor (30).

Figure 5:
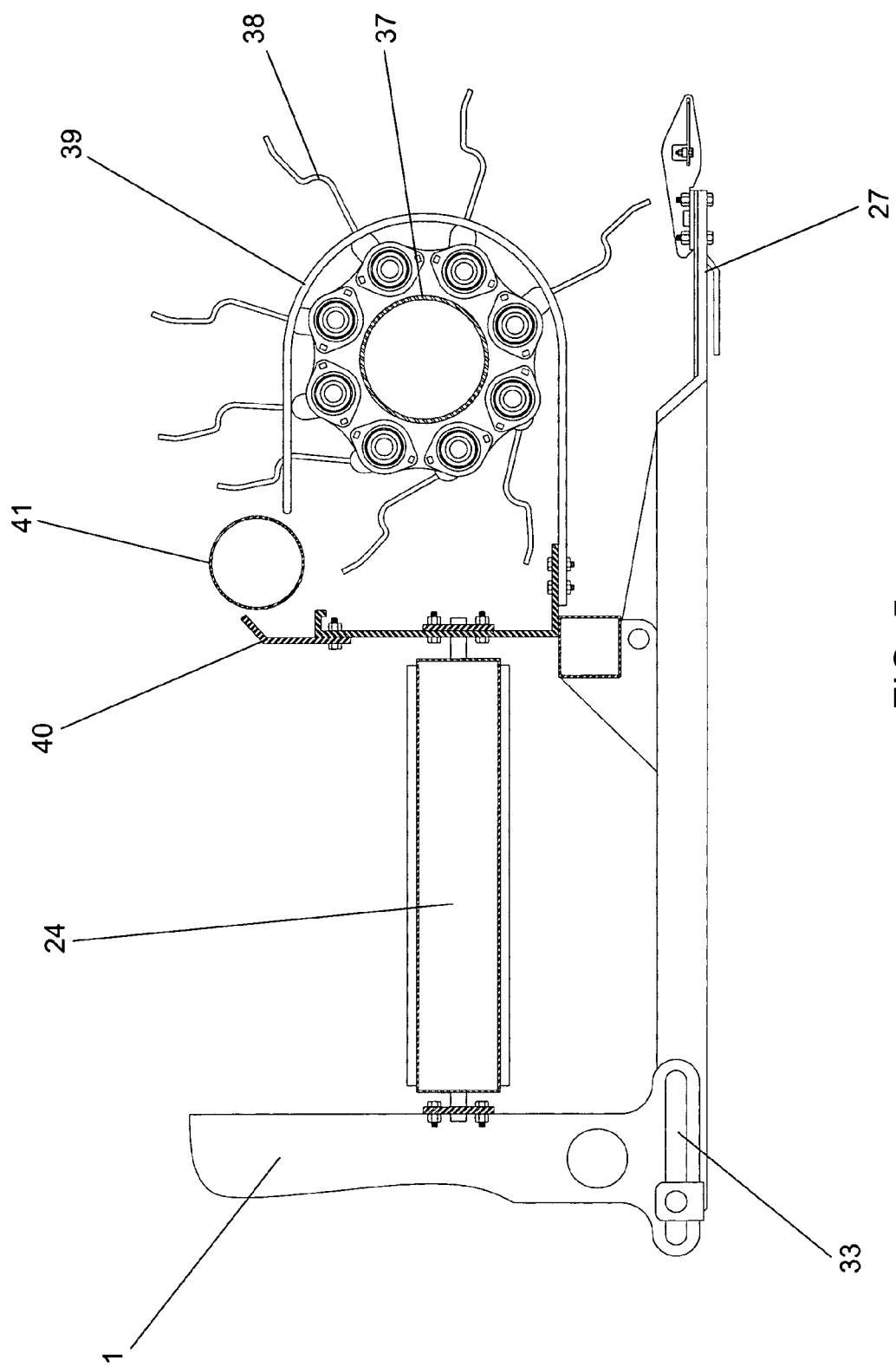
FIG. 5 shows an extended cross-section detail of the left side view, detailing the reaping assembly.

The branch collecting assembly (13) is illustrated on FIG. 5, wherein it can be seen that it is comprised of a roll (37) having a plurality of retractable arched fangs (38) circularly arranged in groups of eight units, so that between one and the other group U-shaped plates (39) be intercalated, with the rounded end of which being turned to the front, whereas the ends thereof are attached to a portion of the structure or supports (40), above which the dragging roll (41) is positioned.

As can be seen, after what has been described and illustrated, the equipment in question is of the kind classified as a large-scale one, since it has been developed to be put in operation by means of an automotive machine, the coupling of which takes place through known coupling means and, after that, the hydraulic system (23–29–30) is connected to the corresponding portions of the automotive machine, forming an hydraulic circuit powered by the automotive machine pump, so that the hydraulic motors can be put in operation and, with these, the reaper (27), the collecting roll (28), the line opener (11) and the conveyors are also put in operation. With those assemblies working, the equipment is displaced towards the plants to be processed. In this manner, the line opening assembly (11) causes the plants of the lateral boundaries of the machine to be forced inwards and, soon thereafter, be hit by the reaping assembly (27), which cuts the plants close to the ground. The skid (14) allows the line opener to slide smoothly over the ground. Once the plants are reaped, they are soon thereafter collected by the collecting roll (28), and thrown backwards, where such movement continues through the roll (41), which dispenses said plants on the conveyors (24), which turn towards the opening (24); accordingly, all plants are conveyed towards said opening, which is positioned at the center of the assembly and with this the plants are properly aligned over the ground.

What is claimed is:

1. ARRANGEMENT INTRODUCED IN AN AGRICULTURAL IMPLEMENT FOR REAPING AND COLLECTING BRANCHES OF DIVERSE CULTURES, characterized in that it comprises a chassis (1) formed of various front (2) and rear (3) transversal, tubular components, interconnected by cross beams (4) and front (5) and rear (6) vertical and lateral supports, forming a generally parallelepiped-shaped structures, the front and rear components of which comprise attachment points for front (7) and rear (8) wheel carriages, the rear portion of which includes universal coupling means for connection to the drive unit; said front wheel carriages (7) are assembled at the lower ends of L-shaped supports (9), the upper ends of which are adjustably attached (10) to the corresponding component of the chassis (1), where said supports (9) also constitute supports for the line openers (11) assembled at the front of the front wheel carriages (4), with each wheel carriage having a pantographic support formed of two arms (12) which at one end are hingedly attached to the L-shaped support (9), whereas at the opposite ends they are hingedly attached to a ramped structure (13), to the lower end of the ramped structure (13) is attached a skid (14) and bar comb (15); in addition, along the front portion of such ramped structure (13) is rotatingly attached a roll (16) which, in addition of having its surface provided with a senoidal rib, also has its upper end operationally coupled to a cardan shaft (17) which in turn extends rearwards, fully crossing the structure (1), passing through two bearings (18) so that its end may receive a pulley (19) and respective belt (20), which extends downwards to another lower pulley (21), the shaft (22) of which is driven by hydraulic motor (23) at one end thereof, whereas its opposite is provided to drive one of two conveyors (24) transversely assembled on the lower and rear portion of the structure (1), these conveyors acting to receive the collected branches, with a discharge opening (25) arranged between said conveyors and, to that effect, said conveyors (15) rotate in opposite directions in order to displace the collected branches towards said central opening (25); at the rear portion of the implement the other wheel carriage (8) is assembled jointly with supports (26) turning them into steerable rollers or wheels; at the front, lower portion of the chassis (1) a reaping assembly (27) is transversely assembled and, right above it or inside the first half of the chassis (1) and before the conveyors (24) is assembled a branch collecting assembly (28), both being driven by further hydraulic motors (29) and (30), with the first one including a transmission (31), whereas the other is assembled directly to the drive shaft of said reaping assembly (27), which is comprised of a lower structure (32), in the shape of a frame, with the rear portion of the frame being adjustably attached through a sliding fit (33) directly to the rear, lower portion of the chassis (1), whereas at the front end said reaper is kept suspended by a vertical spring (34) and respective stretching bolt attached to the chassis (1); also at said end said reaper possesses the cutting points (35) each crossed by a V-shaped cutting blade assembled on a ruler which is in turn coupled to a drive box with an eccentric output shaft (36) which is in turn coupled to the hydraulic motor (30); said branch collecting assembly (28) is comprised of a roll (37) with a plurality of arched, retractile fangs (38) circularly arranged in groups of eight, so that between one and another group U-shaped plates (39) are intercalated, with the round end of which being turned to the front, whereas their ends are attached to a structure or support points (40) above which a dragging roll (41) is positioned.

* * * * *